United States Patent
Lempkowski et al.

(10) Patent No.: US 7,499,257 B2
(45) Date of Patent: Mar. 3, 2009

(54) MICRO-ELECTRO-MECHANICAL SYSTEM VARACTOR

(75) Inventors: Robert B. Lempkowski, Elk Grove, IL (US); Lih-Tyng Hwang, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 144 days.

(21) Appl. No.: 11/767,147

(22) Filed: Jun. 22, 2007

(65) Prior Publication Data

US 2008/0315362 A1    Dec. 25, 2008

(51) Int. Cl.
*H01G 5/00* (2006.01)
(52) U.S. Cl. .................. 361/287; 361/277; 361/278; 361/280; 361/290; 361/292
(58) Field of Classification Search .......... 361/287, 361/290, 292, 273, 277, 278, 283.3, 286; 333/101, 103, 262
See application file for complete search history.

(56) References Cited

U.S. PATENT DOCUMENTS

| | | | |
|---|---|---|---|
| 6,448,873 B1 * | 9/2002 | Mostov | 333/185 |
| 6,456,420 B1 * | 9/2002 | Goodwin-Johansson | 359/291 |
| 6,521,939 B1 | 2/2003 | Yeo et al. | |
| 6,635,919 B1 | 10/2003 | Melendez et al. | |
| 6,661,069 B1 | 12/2003 | Chinthakinidi et al. | |
| 6,661,084 B1 * | 12/2003 | Peterson et al. | 257/680 |
| 6,714,105 B2 * | 3/2004 | Eliacin et al. | 333/262 |
| 6,859,119 B2 * | 2/2005 | Eliacin et al. | 333/262 |
| 6,906,905 B1 * | 6/2005 | Chinthakindi | 361/277 |
| 7,056,800 B2 * | 6/2006 | Croswell et al. | 438/381 |
| 7,136,274 B2 * | 11/2006 | Hwang et al. | 361/306.3 |
| 7,141,989 B1 | 11/2006 | Liu | |
| 7,463,113 B2 * | 12/2008 | Tungare et al. | 333/105 |

OTHER PUBLICATIONS

PCT Search Report, PCT/US2008/066419, Sep. 23, 2008.

* cited by examiner

*Primary Examiner*—Nguyen T Ha

(57) ABSTRACT

A micro-electro-mechanical system varactor. The varactor includes a substrate, a lower bias conductor partially overlaying the substrate, a first signal conductor partially overlaying the substrate, a dielectric layer at least partially overlaying the first signal conductor, a support structure coupled to the substrate, and a flexible structure coupled to the support structure. The flexible structure is suspended over the substrate, includes an upper bias conductor overlaying at least part of the lower bias conductor and a top conductor overlaying at least part of the first signal conductor, configured to deflect in response to a bias voltage applied between the upper bias conductor and the lower bias conductor, and configured for separation between the top conductor and the dielectric layer by a varying separation distance dependent upon the bias voltage.

20 Claims, 5 Drawing Sheets

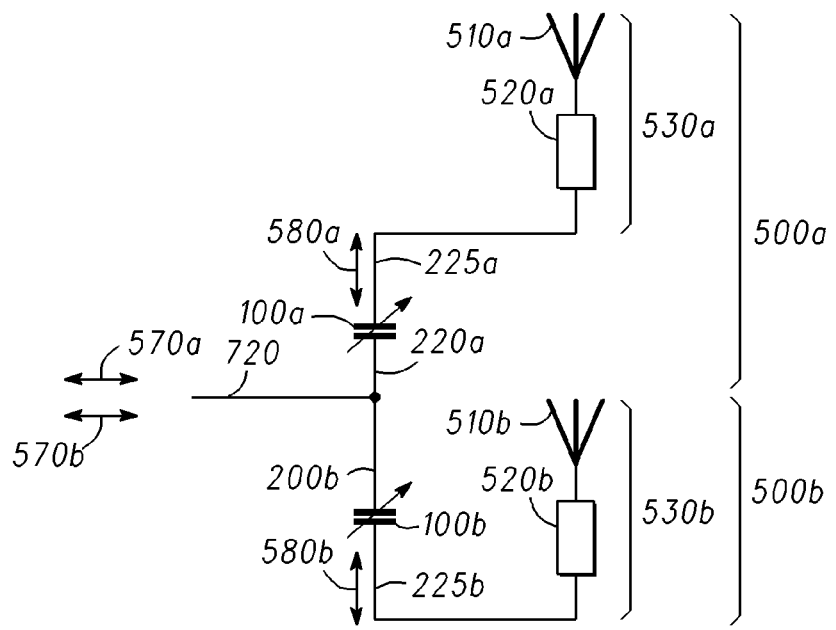
Fig. 8    700
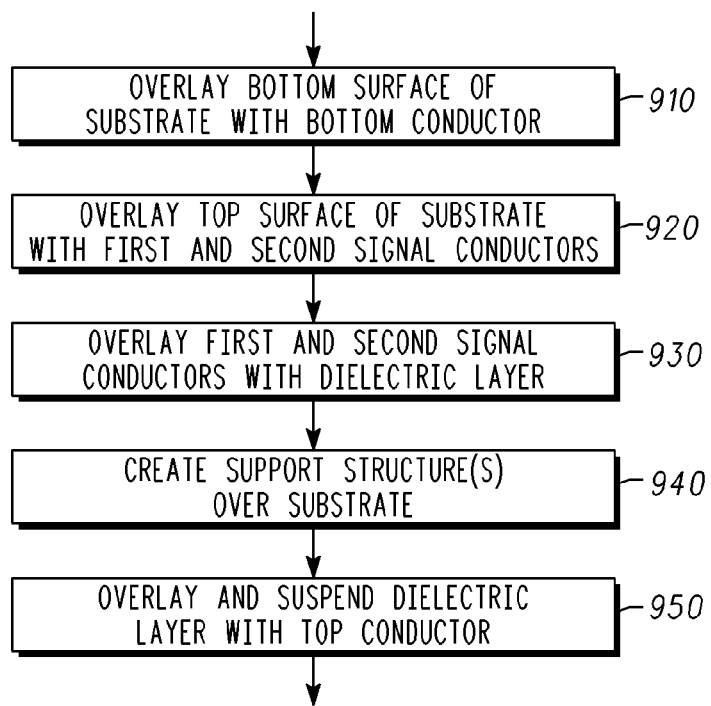
Fig. 9    900

MICRO-ELECTRO-MECHANICAL SYSTEM VARACTOR

BACKGROUND

For various reasons, including cost and performance, efforts at reducing the size of electronic devices, circuits, and systems is ongoing. The goal of one such area of current active effort, micro-electro-mechanical systems (MEMS), is to reduce the size of various electronic components as well as electromechanical devices used in conjunction with those electronic components. Techniques used in creating micro-electro-mechanical systems merge the processes used in fabricating the electronic and the mechanical components. A simplification in construction, as well as a cost savings, is obtained thereby. Micro-electro-mechanical systems structures are capable of motion and/or applying force and have been used in a wide variety of applications because they provide advantages in performance, cost, reliability, and small size.

Physical size can be very important in the performance of electronic devices such as radio frequency (RF) or microwave components wherein size relative to wavelength can influence parameters such as skin depth, parasitic inductance and capacitance, transmission line behavior, and radiation characteristics. Various micro-electro-mechanical systems include switches, varactors, inductors, and resonators and have been fabricated using MEMS technology.

As is known to one skilled in the art, a varactor is a device whose capacitance varies in relation to an applied voltage. Varactors can be important elements in various high-frequency and radio frequency electronic circuits such as variable-frequency oscillators, tuned amplifiers, parametric amplifiers, phase shifters, equalizers, and impedance-matching circuits. A change in capacitance can be effected by forcing a change in the distance or effective distance (as in a reversed biased p-n junction) between the plates of a capacitor in response to a change in a bias voltage applied between the two plates.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

FIG. 8 is a drawing of a dual antenna system having two of the micro-electro-mechanical system varactors shown in FIGS. 2A-2C.

FIG. 9 is a flow chart of a method for fabricating a micro-electro-mechanical system varactor as described in various representative embodiments.

DETAILED DESCRIPTION

Figure 1A:
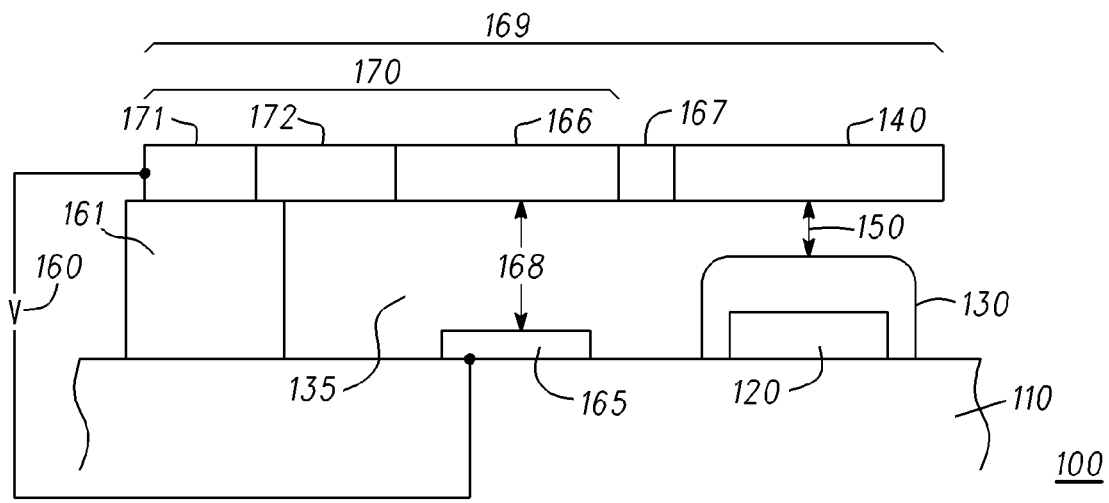
FIG. 1A is a drawing of a side view of a micro-electro-mechanical system varactor as described in various representative embodiments.

As shown in the drawings for purposes of illustration, novel techniques are disclosed herein for a micro-electro-mechanical system varactor. The micro-electro-mechanical system varactor has a moveable top conductor suspended over two signal conductors. An electrostatic capacitor has top and bottom conductors and is isolated from the varactor conductors. A voltage applied between the top conductor and a bottom conductor forces the varactor top conductor to move closer to the two signal conductors thereby increasing the capacitances between the top conductor and each of the two signal conductors while the capacitance between the two signal conductors remains constant. A dielectric layer interposed between the two signal conductors prevents shorting the top conductor to either of the two signal conductors. The varactors disclosed herein can also be implemented using microstrip, coplanar waveguide (CPW), or other radio frequency (RF) transmission line technology. A microstrip is a thin, flat electrical conductor separated from a ground plane by a dielectric layer. Microstrips are typically used in printed circuits for routing high frequency signals. The varactors can be implemented as coplanar waveguide transmission lines by appropriately altering the geometry that defines the signal conductor widths and gaps to ground on the same layer of printed circuit boards. Similarly, other RF transmission line geometries such as finline, suspended stripline, stripline, and other transmission line structures can be made to incorporate the varactor using controlled impedance methods.

Previous micro-electro-mechanical varactors comprise semiconductors and use different structures. The capacitances of these previous micro-electro-mechanical varactors is limited to small values resulting in such devices being applicable only to frequencies typically greater than 10 GHz. Simulation and analysis of the representative embodiments disclosed herein indicate that these embodiments can be effectively used in at least the 400 MHz or lower through 10 GHz frequency range with tuning ratios of greater than 10. The tuning ratio is the ratio of the highest value of capacitance achieved during the closed position divided by the lowest value of capacitance achieved during the fully open position.

In the following detailed description and in the several figures of the drawings, like elements are identified with like reference numerals.

Figure 2A:
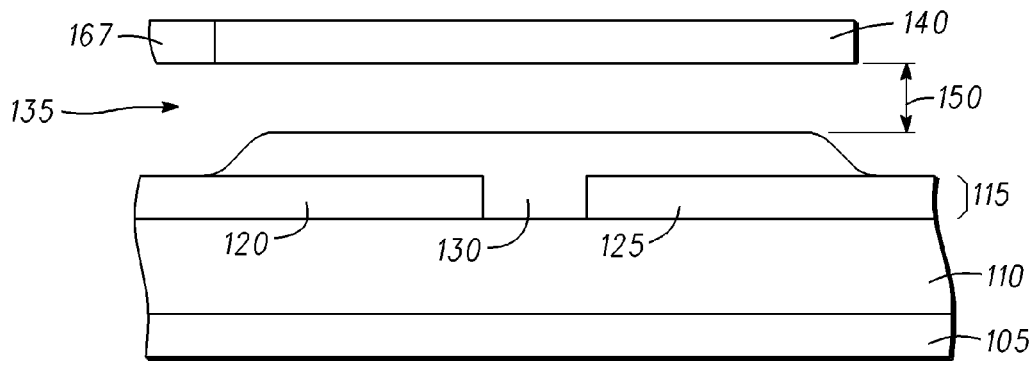
FIG. 2A is a drawing of another side view the micro-electro-mechanical system varactor of FIG. 1A.
Figure 2B:
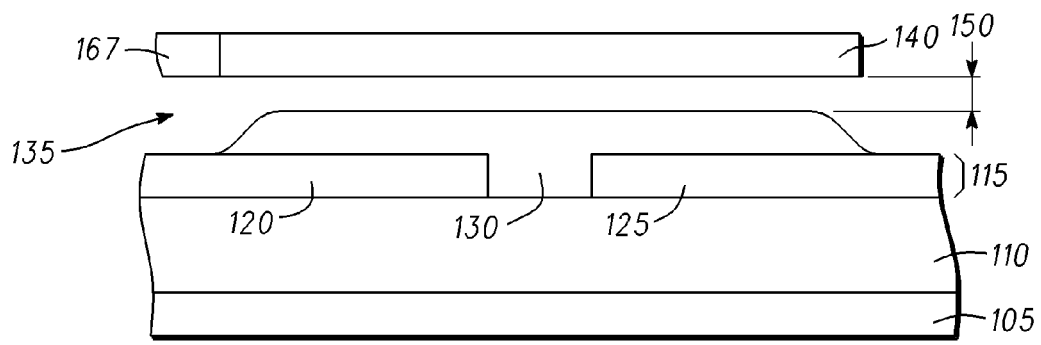
FIG. 2B is a drawing of another side view of the micro-electro-mechanical system varactor of FIG. 2A.
Figure 2C:
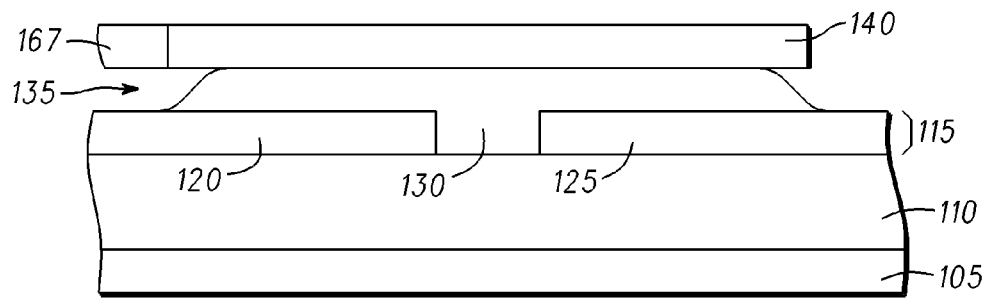
FIG. 2C is a drawing of still another side view of the micro-electro-mechanical system varactor of FIG. 2A.

FIG. 1A is a drawing of a side view of a micro-electro-mechanical system varactor 100 as described in various representative embodiments. The micro-electro-mechanical system varactor 100 in FIG. 1A is shown implemented in microstrip technology. In FIG. 1A, the micro-electro-mechanical system varactor 100 which is also referred to herein as varactor 100 comprises a substrate 110, a lower bias conductor 165, a first signal conductor 120, a second signal conductor 125 which is not visible in FIG. 1A, a dielectric layer 130, a support structure 161 which is also referred to herein as post 161, a flexible structure 169, and a bottom conductor 105 (a ground plane 105) as shown in FIGS. 2A-2C. For certain antenna and other structures, the ground plane 105 is not needed. The flexible structure 169 comprises a connecting conductor 170, an insulating spacer 167, and a top conductor 140. The connecting conductor 170 comprises an attachment section 171, a beam section 172, and an upper bias section 166 which is also referred to herein as an upper bias conductor 166. The attachment section 171, the beam section 172, and the upper bias section 166 can be fabricated as one continuous piece. The lower bias conductor 165, the first signal conductor 120 and the second signal conductor 125 overlay the substrate 110; and the dielectric layer 130 overlays the first and the second signal conductors 120,125 under and in proximity to the top conductor 140. The flexible structure 169 is suspended over the substrate 110 with the upper bias conductor 166 suspended over the lower bias conductor 165 and with the top conductor 140 suspended over the dielectric layer 130, the first signal conductor 120, and the second signal conductor 125. A separation space 135 which could be air, another gas, a vacuum, or the like is shown between the flexible structure 169 and the lower bias conductor 165 and between the flexible structure 169 and the dielectric layer 130. The attachment section 171 is coupled to the post 161, and the beam section 172 is flexible and configured to enable bending and return to its original dimensions. The varactor 100 is mechanically enabled by the electrostatic capacitor structure of the upper bias conductor 166 and the lower bias conductor 165 which is supported by post 161 and coupled to the moveable top conductor 140. If the magnitude of a bias voltage 160 applied between the lower bias conductor 165 and the upper bias conductor 166 is zero, a separation distance 150 between the top conductor 140 and the dielectric layer 130 has a first value. At zero bias voltage 160 the separation distance 150 is at its maximum and considered to be in a fully open condition.

The closing distances can be different for the upper bias conductor 166 to lower bias conductor 165 and for the moveable top conductor 140 to the top of the dielectric layer 130. The first and second signal conductors 120 and 125 can be thicker than the lower bias conductor 165 so as to cause the closure of top conductor 140 to dielectric layer 130 to occur and act as a stop before the upper bias conductor 166 can contact the lower bias conductor 165. MEMS switch structures have been shown to typically close in a controlled manner to the 1/3 point of closure, commonly referred to as the pull-in or pull-down point. Then due to the fact that smaller gaps cause increased forces, the switches will close in a highly non-linear manner. In order to provide improved control over the continuously varying capacitance caused by the top conductor 140 closing on the dielectric layer 130, the height of the first and second signal conductors 120,125 and the height of the dielectric layer 130 are fabricated so as to keep the point of closure to less than 1/3 of the travel, or at the pull-in or pull-down point of the upper bias conductor 166 across gap 168.

The top conductor 140 can be suspended using the techniques of micro-electro-mechanical systems which are well known in the art. This suspension can be implemented either using a cantilever structure as in FIG. 1A or a bridge structure. If a cantilever structure is used, one end of the flexible structure 169 is supported above the substrate 110 by a support structure 161 as in FIG. 1A. If a bridge structure is used, the flexible structure 169 is supported above the substrate 110 by a support structure 161 or structures on at least two sides of the flexible structure 169. Such structures are well known to one of ordinary skill in the art.

Figure 1B:
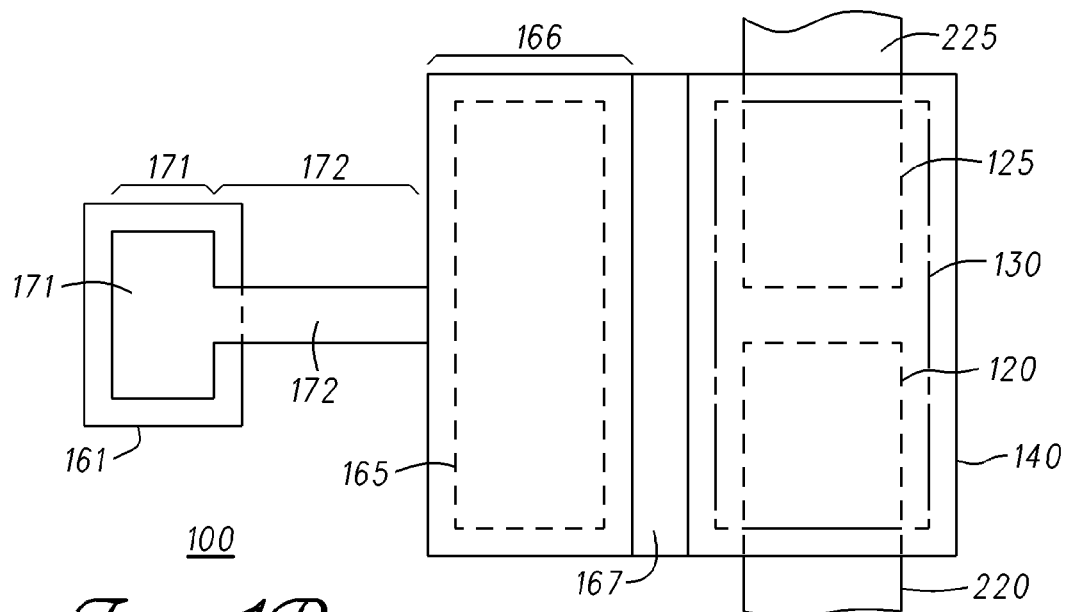
FIG. 1B is a drawing of a top view of the micro-electro-mechanical system varactor of FIG. 1A.

FIG. 1B is a drawing of a top view of the micro-electro-mechanical system varactor 100 of FIG. 1A. In FIG. 1B, the attachment section 171 overlays and is coupled to the post 161; the beam section 172 is configured to be flexible and takes on any number of straight or meandered sections or other means to obtain the desired spring constant, overlays part of the post 161, and is suspended over the substrate 110; the upper bias conductor 166 is suspended over the lower bias conductor 165; the insulating spacer 167 separates the upper bias conductor 166 from the top conductor 140 and electrically insulates the upper bias conductor 166 from the top conductor 140; and the top conductor 140 is suspended over the dielectric layer 130, the first signal conductor 120, and the second signal conductor 125. Coupling between the first signal conductor 120 and various other components can be made through a first signal line 220 which is shown in FIG. 1B as connected to the first signal conductor 120 and coupling between the second signal conductor 125 and various other components can be made through a second signal line 225 which is shown in FIG. 1B as connected to the second signal conductor 125. While the first signal line 220 is shown as having the same width as the first signal conductor 120 and the second signal line 225 is shown as having the same width as the second signal conductor 125, the widths of the first and second signal lines 220,225 and the widths of the first and second signal conductors 120,125 can be adjusted independently and as necessary for signal handling purposes.

FIG. 2A is a drawing of another side view the micro-electro-mechanical system varactor 100 of FIG. 1A. The micro-electro-mechanical system varactor 100 in FIG. 2A is shown implemented in microstrip technology. In FIG. 2A, the varactor 100 comprises a bottom conductor 105, a substrate 110, a first signal conductor 120, a second signal conductor 125, a dielectric layer 130, and a top conductor 140. The varactor 100 is mechanically enabled by the electrostatic capacitor structure of the upper bias conductor 166 and the lower bias conductor 165 which is supported by post 161 and coupled to the moveable top conductor 140. The substrate 110 overlays the bottom conductor 105; the first signal conductor 120 and the second signal conductor 125 overlay the substrate 110 and can reside in a signal conductive layer 115; and the dielectric layer 130 overlays the first and the second signal conductors 120,125. The top conductor 140 is moveable and is suspended over the dielectric layer 130. A separation space 135 which could be air, another gas, a vacuum, or the like is shown between the top conductor 140 and the first and second signal conductors 120,125. If the magnitude of a bias voltage 160 applied between the lower bias conductor 165 and the upper bias conductor 166 is zero, a separation distance 150 between the top conductor 140 and the dielectric layer 130 has a first value. At zero bias voltage 160 the separation distance 150 is at its maximum.

The top conductor 140 can be suspended using the techniques of micro-electro-mechanical systems which are well known in the art. This suspension can be implemented either using a cantilever structure or a bridge structure. If a cantilever structure is used, one end of the flexible structure 169 is supported above the substrate 110 by a support structure 161 as in FIG. 1A. If a bridge structure is used, the flexible structure 169 is supported above the substrate 110 by a support structure 161 or structures on at least two sides of the flexible structure 169. Such structures are well known to one of ordinary skill in the art.

FIG. 2B is a drawing of another side view of the micro-electro-mechanical system varactor 100 of FIG. 2A. In FIG. 2B, the magnitude of the bias voltage 160 is greater than zero which forces the top conductor 140 to move closer to the bottom conductor 105 thereby reducing the separation distance 150 between the top conductor 140 and the dielectric layer 130 to a value less than its initial value for a zero bias voltage 160. In the process the top conductor 140 also moves closer to the first signal conductor 120 and closer to the second signal conductor 125 which increases the capacitance between the top conductor 140 and the first signal conductor 120 and also increases the capacitance between the top conductor 140 and the bottom conductor 105.

FIG. 2C is a drawing of still another side view of the micro-electro-mechanical system varactor 100 of FIG. 2A. In FIG. 2C, a bias voltage 160 having a magnitude greater than a specified value is applied between the upper bias conductor 166 and the lower bias conductor 165 which results in pulling the top conductor 140 into physical contact with the dielectric layer 130. The capacitance between the top conductor 140 and the first signal conductor 120 is at its largest value in the configuration of FIG. 2C with a zero separation distance 150. The capacitance between the top conductor 140 and the second signal conductor 125 is also at its largest value in the configuration of FIG. 2C. Conversely, the capacitance between the top conductor 140 and the first signal conductor 120 is at its smallest value in the configuration of FIG. 2A, as is the capacitance between the top conductor 140 and the second signal conductor 125.

Figure 3A:
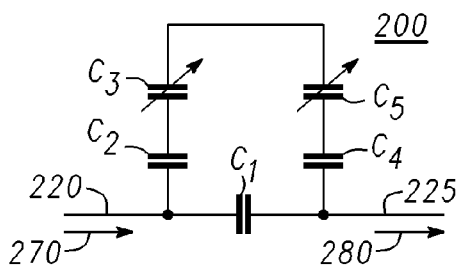
FIG. 3A is a drawing of an equivalent circuit of the micro-electro-mechanical system varactor of FIGS. 2A and 2B.

FIG. 3A is a drawing of an equivalent circuit 200 of the micro-electro-mechanical system varactor 100 of FIGS. 2A and 2B. In FIG. 3A, the capacitance between the first signal conductor 120 and the second signal conductor 125 is represented by a first capacitor $C_1$ shown between a first signal line 220 and a second signal line 225 wherein the connection to the first signal line 220 represents coupling to the first signal conductor 120 and wherein the connection to the second signal line 225 represents coupling to the second signal conductor 125. The capacitance between the top conductor 140 and the first signal conductor 120 is represented by the series combination of a second capacitor $C_2$ and a variable capacitance third capacitor $C_3$, wherein the connection to the first signal line 220 of one side of the second capacitor $C_2$ represents coupling to the first signal conductor 120 and wherein the other side of the second capacitor $C_2$ is coupled to one side of the third capacitor $C_3$. The capacitance between the top conductor 140 and the second signal conductor 125 is represented by the series combination of a fourth capacitor $C_4$ and a variable capacitance fifth capacitor $C_5$, wherein the connection to the second signal line 225 of one side of the fourth capacitor $C_4$ represents coupling to the second signal conductor 125, wherein the other side of the fourth capacitor $C_4$ is coupled to one side of the fifth capacitor $C_5$, and wherein the other side of the fifth capacitor $C_5$ is coupled to the other side of the third capacitor $C_3$. The capacitances of the third capacitor $C_3$ and the fifth capacitor $C_5$ vary as the value of the bias voltage 160 applied between the upper bias conductor 166 and the lower bias conductor 165 varies and forces the top conductor 140 to move closer to or further from the first and the second signal conductors 120,125. An input signal 270 received on first signal line 220 appears as output signal 280 on the second signal line 225.

Figure 3B:
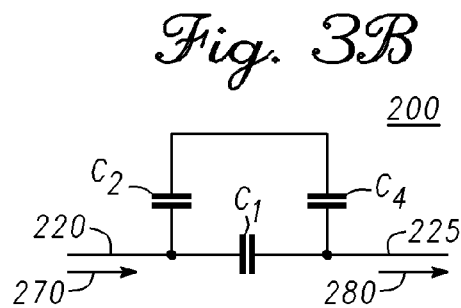
FIG. 3B is a drawing of an equivalent circuit of the micro-electro-mechanical system varactor of FIG. 2C.

FIG. 3B is a drawing of an equivalent circuit 200 of the micro-electro-mechanical system varactor 100 of FIG. 2C. As in FIG. 2C, a bias voltage 160 having a magnitude greater than a specified value is applied between the upper bias conductor 166 and the lower bias conductor 165 which results in pulling the top conductor 140 into physical contact with the dielectric layer 130. In this configuration, the values of the third capacitor $C_3$ and the fifth capacitor $C_5$ have increased to the point that they disappear from the equivalent circuit 200 of FIG. 3B leaving only the second capacitor $C_2$, one side of which is coupled to the first signal line 220, and the fourth capacitor $C_4$, one side of which is coupled to the second signal line 225 with the other side of the second capacitor $C_2$ coupled to the other side of the fourth capacitor $C_4$. The capacitance between the top conductor 140 and the first signal conductor 120 is at its largest value in the configuration of FIG. 2C for the structure of FIGS. 2A-2C, i.e., the capacitance of the second capacitor $C_2$, and the capacitance between the top conductor 140 and the bottom conductor 105 is at its largest value in the configuration of FIG. 2C for the structure of FIGS. 2A-2C, i.e., the capacitance of the fourth capacitor $C_4$. An input signal 270 received on first signal line 220 appears as output signal 280 on the second signal line 225.

Figure 4A:
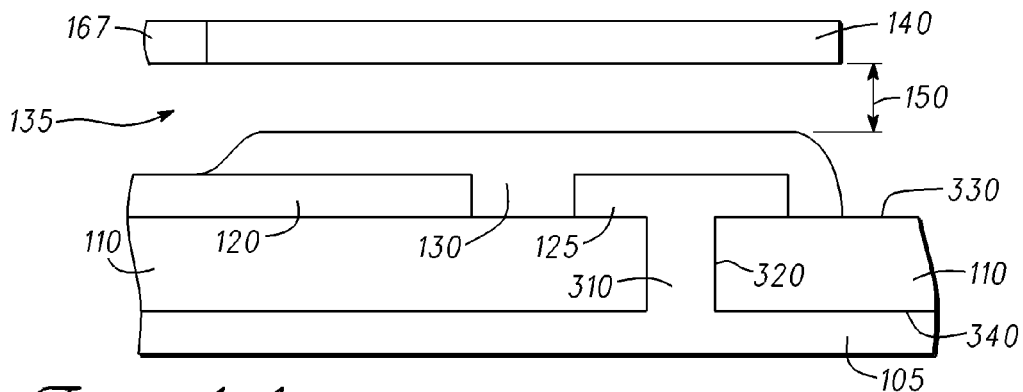
FIG. 4A is a drawing of still another side view the micro-electro-mechanical system varactor of FIG. 1A.

FIG. 4A is a drawing of still another side view the micro-electro-mechanical system varactor 100 of FIG. 1A. In FIG. 4A, the varactor 100 comprises a bottom conductor 105, a substrate 110, a first signal conductor 120, a second signal conductor 125, a dielectric layer 130, and a top conductor 140. The varactor 100 is mechanically enabled by the electrostatic capacitor structure of the upper bias conductor 166 and the lower bias conductor 165 which is supported by post 161 and coupled to the movable top conductor 140. If the magnitude of a bias voltage 160 applied between the lower bias conductor 165 and the upper bias conductor 166 is zero, a separation distance 150 between the top conductor 140 and the dielectric layer 130 has a first value. At zero bias voltage 160 the separation distance 150 is at its maximum. The substrate 110 overlays the bottom conductor 105; the first signal conductor 120 and the second signal conductor 125 overlay the substrate 110; and the dielectric layer 130 overlays the first and the second signal conductors 120,125. The top conductor 140 is moveable and is suspended over the dielectric layer 130. A separation space 135 which could be air, another gas, a vacuum, or the like is shown between the top conductor 140 and the bottom conductor 105. The moveable top conductor 140 is separated from the dielectric layer 130 by a separation distance 150 which has an initial magnitude of zero for a bias voltage 160 applied between the bottom conductor 105 and the top conductor 140. The top conductor 140 can be suspended using the techniques of micro-electro-mechanical systems which are well known in the art. This suspension can be implemented either using a cantilever structure or a bridge structure. If a cantilever structure is used, one end of the flexible structure 169 is supported above the substrate 110 by a support structure 161 as in FIG. 1A. If a bridge structure is used, the flexible structure 169 is supported above the substrate 110 by a support structure 161 or structures on at least two sides of the flexible structure 169. Such structures are well known to one of ordinary skill in the art.

The varactor 100 of FIG. 4A further comprises a via conductor 310. The substrate 110 has a bottom surface 340 and a top surface 330. A hole 320 is located in the substrate 110 under the second signal conductor 125; the hole 320 extends from the top surface 330 to the bottom surface 340; and the via conductor 310 is connected to both the second signal conductor 125 and the bottom conductor 105 thereby providing a conducting path between the second signal conductor 125 and the bottom conductor 105. Alternatively, the via conductor 310 and the hole 320 could be positioned outside but in proximity to top conductor 140.

The structure of FIG. 4A is suited for microstrip transmission lines. For CPW transmission lines, the second signal conductor 125 is connected to RF ground on top surface 330 instead of to bottom conductor 105 by via conductor 310.

Figure 4B:
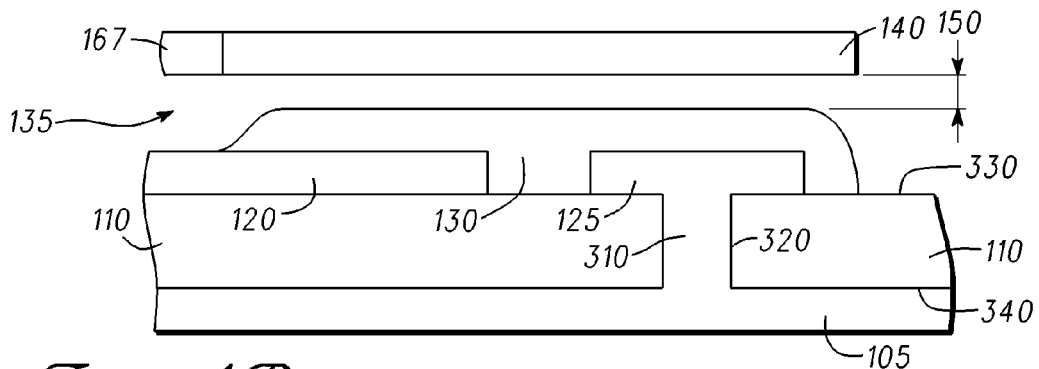
FIG. 4B is a drawing of another side view of the micro-electro-mechanical system varactor of FIG. 4A.

FIG. 4B is a drawing of another side view of the micro-electro-mechanical system varactor 100 of FIG. 4A. In FIG. 4B, the magnitude of the bias voltage 160 (magnitude of intermediate bias value $V_I$) is greater than zero which forces the top conductor 140 to move closer to the bottom conductor 105 thereby reducing the separation distance 150 between the top conductor 140 and the bottom conductor 105 to a value less than its initial value for a zero bias voltage 160. In the process the top conductor 140 also moves closer to the first signal conductor 120 and closer to the second signal conductor 125 which increases the capacitance between the top conductor 140 and the first signal conductor 120 and also increases the capacitance between the top conductor 140 and the second signal conductor 125 or equivalently the bottom conductor 105. Alternatively, the via conductor 310 and the hole 320 could be positioned outside but in proximity to top conductor 140.

Figure 4C:
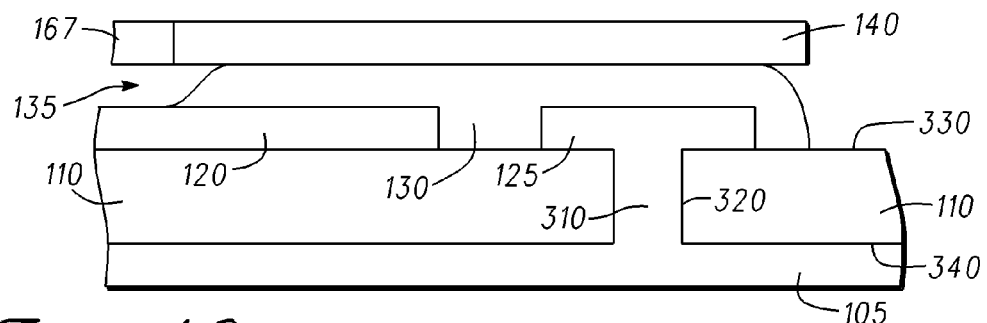
FIG. 4C is a drawing of still another side view of the micro-electro-mechanical system varactor of FIG. 4A.

FIG. 4C is a drawing of still another side view of the micro-electro-mechanical system varactor 100 of FIG. 4A. In FIG. 4C, a bias voltage 160 having a magnitude greater than a specified value is applied between the upper bias conductor 166 and the lower bias conductor 165 which results in pulling the top conductor 140 into physical contact with the dielectric layer 130. The capacitance between the top conductor 140 and the first signal conductor 120 is at its largest value in the configuration of FIG. 4C. The capacitance between the top conductor 140 and the second signal conductor 125 is also at its largest value in the configuration of FIG. 4C. Conversely, the capacitance between the top conductor 140 and the first signal conductor 120 is at its smallest value in the configuration of FIG. 4A, as is the capacitance between the top conductor 140 and the second signal conductor 125. Alternatively, the via conductor 310 and the hole 320 could be positioned outside but in proximity to top conductor 140.

Figure 5A:
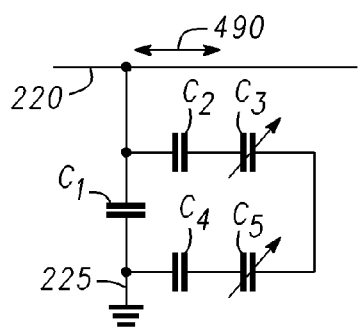
FIG. 5A is a drawing of an equivalent circuit of the micro-electro-mechanical system varactor of FIGS. 4A and 4B.

FIG. 5A is a drawing of an equivalent circuit 200 of the micro-electro-mechanical system varactor 100 of FIGS. 4A and 4B. In FIG. 5A, the capacitance between the first signal conductor 120 and the second signal conductor 125 is represented by the first capacitor $C_1$ shown between a first signal line 220 and a second signal line 225 wherein the connection to the first signal line 220 represents coupling to the first signal conductor 120 and wherein the connection to the second signal line 225 which is connected to a common or ground potential represents coupling to the second signal conductor 125 and to the bottom conductor 105 through the via conductor 310. The capacitance between the top conductor 140 and the first signal conductor 120 is represented by the series capacitance of the second capacitor $C_2$ and the variable capacitance third capacitor $C_3$, wherein the connection to the first signal line 220 of one side of the second capacitor $C_2$ represents coupling to the first signal conductor 120 and wherein the other side of the second capacitor $C_2$ is coupled to one side of the third capacitor $C_3$. The capacitance between the top conductor 140 and the second signal conductor 125 is represented by the series capacitance of the fourth capacitor $C_4$ and the variable capacitance fifth capacitor $C_5$, wherein the connection to the second signal line 225 of one side of the fourth capacitor $C_4$ which is connected to a common or ground potential represents coupling to the second signal conductor 125 and to the bottom conductor 105 through the via conductor 310, wherein the other side of the fourth capacitor $C_4$ is coupled to one side of the fifth capacitor $C_5$, and wherein the other side of the fifth capacitor $C_5$ is coupled to the other side of the third capacitor $C_3$. The capacitances of the third capacitor $C_3$ and the fifth capacitor $C_5$ vary as the value of the bias voltage 160 applied between the upper bias conductor 166 and the lower bias conductor 165 varies and forces the top conductor 140 to move closer to or further from the first and the second signal conductors 120,125. An input/output signal 490 is transferred on first signal line 220.

Figure 5B:
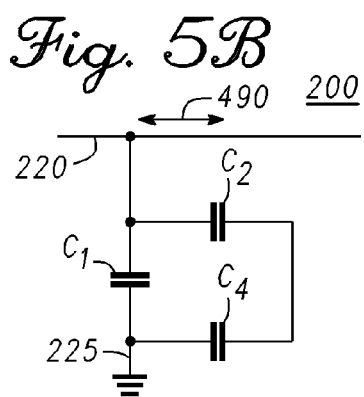
FIG. 5B is a drawing of an equivalent circuit of the micro-electro-mechanical system varactor of FIG. 4C.

FIG. 5B is a drawing of an equivalent circuit 200 of the micro-electro-mechanical system varactor 100 of FIG. 4C. As in FIG. 4C, a bias voltage 160 having a magnitude greater than a specified value is applied between the upper bias conductor 166 and the lower bias conductor 165 which results in pulling the top conductor 140 into physical contact with the dielectric layer 130. In this configuration, the values of the third capacitor $C_3$ and the fifth capacitor $C_5$ have increased to the point that they disappear from the equivalent circuit 200 of FIG. 5B leaving only the second capacitor $C_2$, one side of which is coupled to the first signal line 220, and the fourth capacitor $C_4$, one side of which is coupled to the second signal line 225 which is connected to the common or ground potential with the other side of the second capacitor $C_2$ coupled to the other side of the fourth capacitor $C_4$. The capacitance between the top conductor 140 and the first signal conductor 120 is at its largest value in the configuration of FIG. 4C for the structure of FIGS. 4A-4C, i.e., the capacitance of the second capacitor $C_2$, and the capacitance between the top conductor 140 and the second signal conductor 125 is at its largest value in the configuration of FIG. 4C for the structure of FIGS. 4A-4C, i.e., the capacitance of the fourth capacitor $C_4$. An input/output signal 490 is transferred on first signal line 220.

Figure 6A:
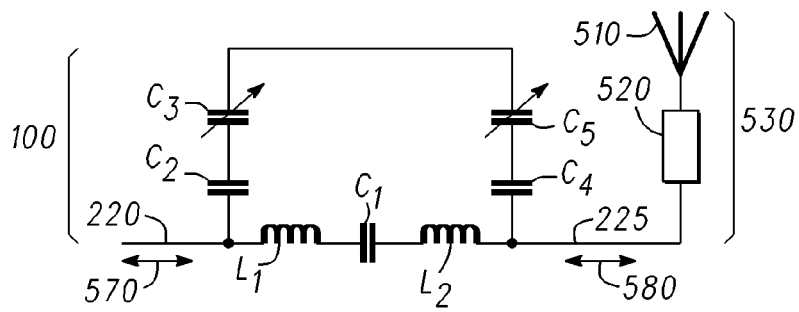
FIG. 6A is a drawing of an antenna system with an equivalent circuit of the micro-electro-mechanical system varactor of FIGS. 2A and 2B.

FIG. 6A is a drawing of an antenna system 500 with an equivalent circuit 200 of the micro-electro-mechanical system varactor 100 of FIGS. 2A and 2B. In FIG. 6A, the antenna system 500 comprises the micro-electro-mechanical system varactor 100 of FIGS. 2A and 2B, a first trace inductor $L_1$, a second trace inductor $L_2$, and an antenna device 530. The first and the second trace inductors $L_1, L_2$ could be due respectively to the distributed inductance of the trace transmission line from the first signal line 220 to the first signal conductor 120 and to the trace transmission line from the second signal line 225 to the second signal conductor 125. The antenna device 530 comprises an antenna 510 and antenna components 520. The antenna components 520 could comprise active elements which could be used for amplifying the radio-frequency signal to/from the antenna 510. The antenna components 520 could also comprise passive elements which could be used for tuning the operating frequency of the antenna 510 and/or could be parasitic elements present in the construction of the antenna device 530. In other representative embodiments, the antenna components 520 could also include the varactor 100. In FIG. 6A, the equivalent circuit 200 of the micro-electro-mechanical system varactor 100 is connected and functions as described in the description of FIG. 3A.

A radio-frequency signal is received by or transferred from the antenna system 500 on the first signal line 220. The first and second trace inductors $L_1, L_2$ could be due to distributed lead inductances of the varactor 100 to the first signal line 220 and the second signal line 225 or other transmission line sections. One end of the antenna components 520 is coupled to the second signal line 225, and the other end of the antenna components 520 is coupled to the antenna 510.

With appropriate selection for the values of the first and second trace inductors $L_1, L_2$ and by applying an appropriate value for the bias voltage 160, the varactor 100 can be tuned to the operating frequency of the antenna system 500. As previously indicated, the capacitances of the third capacitor $C_3$ and the fifth capacitor $C_5$ vary as the value of the bias voltage 160 applied between the upper bias conductor 166 and the lower bias conductor 165 varies which causes the distance between top conductor 140 and the signal conductors 120, 125 to vary. In transmitting mode, a circuit-side signal 570 received on first signal line 220 is modified by the tuned circuit comprising the varactor 100 with the first and second trace inductors $L_1, L_2$ and appears as antenna-side signal 580 on the second signal line 225 for transmission by the antenna device 530. In receiving mode, an antenna-side signal 580 received on second signal line 225 from the antenna device 530 is modified by the tuned circuit comprising the varactor 100 and the first and second trace inductors $L_1, L_2$ and appears as circuit-side signal 570 on the first signal line 220.

Figure 6B:
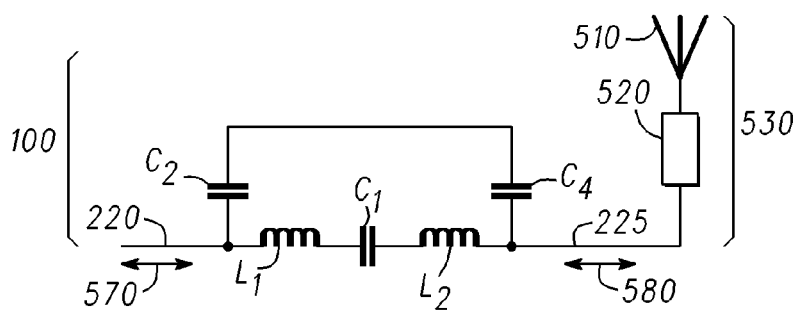
FIG. 6B is a drawing of the antenna system of FIG. 6A with the equivalent circuit of the micro-electro-mechanical system varactor of FIG. 2C.

FIG. 6B is a drawing of the antenna system 500 of FIG. 6A with the equivalent circuit 200 of the micro-electro-mechanical system varactor 100 of FIG. 2C. In FIG. 6B, the antenna system 500 comprises the micro-electro-mechanical system varactor 100 of FIG. 2C, the first trace inductor $L_1$, the second trace inductor $L_2$, and the antenna device 530. The antenna device 530 comprises the antenna 510 and antenna components 520. As in FIG. 2C, a bias voltage 160 having a magnitude greater than a specified value is applied between the upper bias conductor 166 and the lower bias conductor 165 which results in pulling the top conductor 140 into physical contact with the dielectric layer 130. In this configuration, the values of the third capacitor $C_3$ and the fifth capacitor $C_5$ have increased to the point that they disappear from the equivalent circuit 200 of FIG. 6B leaving only the second capacitor $C_2$ and the fourth capacitor $C_4$ connected and functioning as described in the description of FIG. 3B. Regarding FIGS. 6A and 6B, the capacitance of the varactor 100 is at its largest value for the equivalent circuit 200 of FIG. 6B with lesser capacitance values for the equivalent circuit 200 of FIG. 6A.

In transmitting mode, a circuit-side signal 570 received on first signal line 220 is modified by the tuned circuit comprising the varactor 100 with the first and second trace inductors $L_1, L_2$ and appears as antenna-side signal 580 on the second signal line 225 for transmission by the antenna device 530. In receiving mode, an antenna-side signal 580 received on second signal line 225 from the antenna device 530 is modified by the tuned circuit comprising the varactor 100 and the first and second trace inductors $L_1, L_2$ and appears as circuit-side signal 570 on the first signal line 220.

Figure 7A:
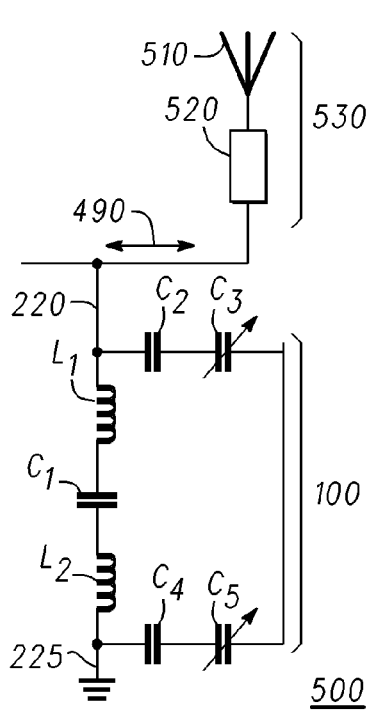
FIG. 7A is a drawing of an antenna system with an equivalent circuit of the micro-electro-mechanical system varactor of FIGS. 4A and 4B.

FIG. 7A is a drawing of an antenna system 500 with an equivalent circuit 200 of the micro-electro-mechanical system varactor 100 of FIGS. 4A and 4B. In FIG. 7A, the antenna system 500 comprises the micro-electro-mechanical system varactor 100 of FIGS. 4A and 4B, a first trace inductor $L_1$, a second trace inductor $L_2$, and an antenna device 530. The antenna device 530 comprises an antenna 510 and antenna components 520. The antenna components 520 could comprise active elements which could be used for amplifying the radio-frequency signal to/from the antenna 510. The antenna components 520 could also comprise passive elements which could be used for tuning the operating frequency of the antenna 510 and/or could be parasitic elements present in the construction of the antenna device 530. In FIG. 7A, the equivalent circuit 200 of the micro-electro-mechanical system varactor 100 is connected and functions as described in the description of FIG. 5A.

A radio-frequency signal is received by or transferred from the antenna system 500 on the first signal line 220. The first and the second trace inductors $L_1, L_2$ could be due respectively to the distributed inductance of the trace transmission line from the first signal line 220 to the first signal conductor 120 and to the trace transmission line from the second signal line 225 to the second signal conductor 125. The second signal line 225 is connected to a common or ground potential. One end of the antenna components 520 is coupled to the first signal line 220, and the other end of the antenna components 520 is coupled to the antenna 510.

With appropriate selection for the values of the inductances of the first and second trace inductors $L_1, L_2$ and by applying an appropriate value for the bias voltage 160, the combination of the first and second trace inductors $L_1, L_2$ and the varactor 100 can be tuned to a designed operating frequency of the antenna system 500. As previously indicated, the capacitances of the third capacitor $C_3$ and the fifth capacitor $C_5$ vary as the value of the bias voltage 160 applied between the upper bias conductor 166 and the lower bias conductor 165 varies. In transmitting mode, an input/output signal 490 is received on the first signal line 220 for transmission by the antenna device 530. In receiving mode, an input/output signal 490 received from the antenna device 530 is transferred on first signal line 220.

Figure 7B:
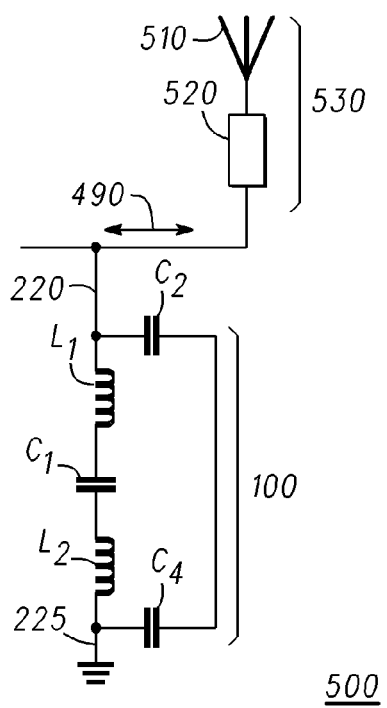
FIG. 7B is a drawing of the antenna system of FIG. 7A with an equivalent circuit of the micro-electro-mechanical system varactor of FIG. 4C.

FIG. 7B is a drawing of the antenna system 500 of FIG. 7A with an equivalent circuit 200 of the micro-electro-mechanical system varactor 100 of FIG. 4C. In FIG. 7B, the antenna system 500 comprises the micro-electro-mechanical system varactor 100 of FIG. 4C, the first trace inductor $L_1$, the second trace inductor $L_2$, and the antenna device 530. The antenna device 530 comprises the antenna 510 and antenna components 520. As in FIG. 4C, a bias voltage 160 having a magnitude greater than a specified value is applied between the upper bias conductor 166 and the lower bias conductor 165 which results in pulling the top conductor 140 into physical contact with the dielectric layer 130. In this configuration, the values of the third capacitor $C_3$ and the fifth capacitor $C_5$ have increased to the point that they disappear from the equivalent circuit 200 of FIG. 7B leaving only the second capacitor $C_2$ and the fourth capacitor $C_4$ connected and functioning as described in the description of FIG. 5B. Regarding FIGS. 7A and 7B, the capacitance of the varactor 100 is at its largest value for the equivalent circuit 200 of FIG. 7B with lesser capacitance values for the equivalent circuit 200 of FIG. 7A. In transmitting mode, an input/output signal 490 is received on the first signal line 220 for transmission by the antenna device 530. In receiving mode, an input/output signal 490 received from the antenna device 530 is transferred on first signal line 220.

FIG. 8 is a drawing of a dual antenna system 700 having two of the micro-electro-mechanical system varactors 100 shown in FIGS. 2A-2C. In FIG. 8, the dual antenna system 700 comprises first antenna system 500a and second antenna system 500b. The first antenna system 500a comprises first antenna 510a, first antenna components 520a, and first micro-electro-mechanical system varactor 100a. The second antenna system 500b comprises second antenna 510b, second antenna components 520b, and second micro-electro-mechanical system varactor 100b. In other representative embodiments, the antenna components 520a and/or 520b could include the varactor structure 100.

The first micro-electro-mechanical system varactor 100a and second micro-electro-mechanical system varactor 100b have the same general structure as the micro-electro-mechanical system varactor 100 of FIGS. 2A-2C and the same general equivalent circuit 200 of FIGS. 3A-3B. As required in any given implementation, the values for the first, the second, the third, the fourth, and the fifth capacitors $C_1,C_2,C_3,C_4,C_5$ of the first micro-electro-mechanical system varactor 100a can differ from the values for the first, the second, the third, the fourth, and the fifth capacitors $C_1,C_2,C_3,C_4,C_5$ of the second micro-electro-mechanical system varactor 100b.

First first-signal line 220a coupled to one side of the first micro-electro-mechanical system varactor 100a and second first-signal line 220b coupled to one side of the second micro-electro-mechanical system varactor 100b are coupled to input line 720. The other side of the first micro-electro-mechanical system varactor 100a is coupled via first second-signal line 225a to the first antennal device 530a which includes the first antenna 510a and which may or may not include the first antenna components 520a as needed by the implementation. The other side of the second micro-electro-mechanical system varactor 100b is coupled via second second-signal line 225b to the second antennal device 530b which includes the second antenna 510b and which may or may not include the second antenna components 520b as needed by the implementation.

In transmitting mode, a first circuit-side signal 570a and a second circuit-side signal 570b are received on an input line 720. The first micro-electro-mechanical system varactor 100a is tuned to the frequency of the first circuit-side signal 570a while the second micro-electro-mechanical system varactor 100b is tuned to the frequency of the second circuit-side signal 570b. As a result, the first micro-electro-mechanical system varactor 100a blocks or attenuates the second circuit-side signal 570b and passes the first circuit-side signal 570a as first antenna-side signal 580a at first second-signal line 225a for transmission by the first antenna device 530a. Also as a result, the second micro-electro-mechanical system varactor 100b blocks or attenuates the first circuit-side signal 570a and passes the second circuit-side signal 570b as second antenna-side signal 580b at second second-signal line 225b for transmission by the second antenna device 530b.

In receiving mode, the first antenna-side signal 580a is received at first second-signal line 225a from the first antenna device 530a, and the second antenna-side signal 580b is received at second second-signal line 225b from the second antenna device 530b. Since, the first micro-electro-mechanical system varactor 100a is tuned to the frequency of the first antenna-side signal 580a it passes the first antenna-side signal 580a to the first first-signal line 220a as first circuit-side signal 570a. And since, the second micro-electro-mechanical system varactor 100b is tuned to the frequency of the second antenna-side signal 580b it passes the second antenna-side signal 580b to the second first-signal line 220b as second circuit-side signal 570b. Further, since the first micro-electro-mechanical system varactor 100a is tuned to the frequency of the first antenna-side signal 580a, it blocks or at least attenuates signals at other frequencies from reaching the first first-signal line 220a from the first antenna device 530a. And since, the second micro-electro-mechanical system varactor 100b is tuned to the frequency of the second antenna-side signal 580b, it blocks or at least attenuates signals at other frequencies from reaching the second first-signal line 220b. A first circuit-side signal 570a and a second circuit-side signal 570b are then transferred on the input line 720.

FIG. 9 is a flow chart of a method 900 for fabricating a micro-electro-mechanical system varactor 100 as described in various representative embodiments. In block 910 of FIG. 9, the bottom surface 340 of a substrate 110 is overlaid with a bottom conductor 105. Block 910 then transfers control to block 920.

In block 920, the top surface 330 of the substrate 110 is overlaid with the first signal conductor 120 and the second signal conductor 125. Block 920 then transfers control to block 930.

In block 930, the first signal conductor 120 and the second signal conductor 125 are overlaid with the dielectric layer 130. Block 930 then transfers control to block 940.

In block 940, support structure(s) for the moveable top conductor 140 are created on the substrate 110 by use of a sacrificial material that forms the support structure and portions are removed after the next step to form the flexible structure 169, upper bias conductor 166, lower bias conductor 165, insulating spacer 167, and movable top conductor 140. Block 940 then transfers control to block 950.

In block 950, a moveable top conductor 140 is fabricated on the support structure(s) and suspended over the dielectric layer 130. The moveable top conductor 140 is configured to be separated from the dielectric layer 130 by an initial separation distance 150 if a bias voltage 160 applied between the lower bias conductor 165 and the upper bias conductor 166 is zero. The top conductor 140 is also configured to be in physical contact with the dielectric layer 130 if the magnitude of the bias voltage 160 is greater than a specified value (magnitude of full bias value $V_F$). Further, the top conductor 140 is configured to be separated from the dielectric layer 130 by greater than zero and less than the initial separation distance 150 if the bias voltage 160 has magnitude greater than zero and less than the specified value (magnitude of full bias value $V_F$). Block 950 then terminates the process after the sacrificial material is removed.

The material of the substrate 110 could be selected from the group consisting of organic materials, a fiberglass material, a polyimide material, or a ceramic material.

In representative embodiments, a micro-electro-mechanical system varactor 100 is disclosed. The micro-electro-mechanical system varactor 100 comprises a substrate 110, a lower bias conductor 165 partially overlaying the substrate 110, a first signal conductor 120 partially overlaying the substrate 110, a dielectric layer 130 at least partially overlaying the first signal conductor 120, a support structure 161 coupled to the substrate 110, and a flexible structure 169. The flexible structure 169 is coupled to the support structure 161, is suspended over the substrate 110, comprises an upper bias conductor 166 overlaying at least part of the lower bias conductor 165 and a top conductor 140 overlaying at least part of the first signal conductor 120, is configured to deflect in response to a bias voltage 160 applied between the upper bias conductor 166 and the lower bias conductor 165, is configured for separation between the top conductor 140 and the dielectric layer 130 by an initial separation distance 150 if the bias voltage 160 is zero, is configured for physical contact between the top conductor 140 and the dielectric layer 130 if the magnitude of the bias voltage 160 is greater than a specified value, and is configured for separation between the top conductor 140 and the dielectric layer 130 by greater than zero and less than the initial separation distance 150 if the bias voltage 160 has magnitude greater than zero and less than the specified value.

In other representative embodiments, a method 900 for fabricating a micro-electro-mechanical system varactor 100 is disclosed. The method 900 comprises overlaying a top surface 330 of a substrate 110 with a first signal conductor 120 and a second signal conductor 125, overlaying the first signal conductor 120 and the second signal conductor 125 with a dielectric layer 130, creating a support structure 161 coupled to the substrate 110, and attaching a flexible structure 169 overlaying the substrate 110 to the support structure 161. The first signal conductor 120 partially covers the substrate 110; the second signal conductor 125 partially covers the substrate 110; the dielectric layer 130 at least partially covers the first and the second signal conductors 120,125; the flexible structure 169 comprises an upper bias conductor 166 and a top conductor 140; the upper bias conductor 166 at least partially covers the lower bias conductor 165; the top conductor 140 at least partially covers the first signal conductor 120 and the second signal conductor 125; the flexible structure 169 is configured to deflect in response to a bias voltage 160 applied between the upper bias conductor 166 and the lower bias conductor 165; the flexible structure 169 is configured for separation between the top conductor 140 and the dielectric layer 130 by an initial separation distance 150 if the bias voltage 160 is zero; the flexible structure 169 is configured for physical contact between the top conductor 140 and the dielectric layer 130 if the magnitude of the bias voltage 160 is greater than a specified value; and the flexible structure 169 is configured for separation between the top conductor 140 and the dielectric layer 130 by greater than zero and less than the initial separation distance 150 if the bias voltage 160 has magnitude greater than zero and less than the specified value.

And in still other representative embodiments, a micro-electro-mechanical system varactor 100 is disclosed which comprises a first means for capacitively coupling an input signal 270 from a first signal line 220 to a second signal line 225 and a variable capacitance means for capacitively coupling the input signal 270 from the first signal line 220 to the second signal line 225. The first means has a fixed value of capacitance; the variable capacitance means comprises a series coupling of a second means, a third means, a fourth means, and a fifth means for capacitively coupling the signal 270 from the first signal line 220 to the second signal line 225; the second means couples the signal 270 from the input first signal line 220 to the third means; the third means couples the signal 270 from the second means to the fifth means; the fifth means couples the signal 270 from the third means to the fourth means; the fourth means couples the signal 270 from the fifth means to the output second signal line 225; the second means and the fourth means have fixed values of capacitance; the capacitances of the third and the fifth means are variable and responsive to a bias voltage 160; the capacitances of the third and the fifth means each have their respective minimum value of capacitance at zero bias voltage 160; and the capacitances of the third and the fifth means each have their respective maximum value of capacitance at and above a magnitude of bias voltage 160 greater than a specified value.

In representative embodiments, the varactors disclosed herein can be implemented using microstrip technology or coplanar waveguide (CPW) transmission line technology on printed circuit board or other appropriate substrates 110. The capacitance of the first capacitor $C_1$ is determined by the thickness, the length, and the separation of the first and the second signal lines 220,225. The first and the second signal conductors 120,125 can be interwoven or interlocked, i.e., interdigitated, to obtain a higher capacitance for the first capacitor $C_1$ in a more compact area for a given separation and thickness of first and the second signal conductors 120, 125. Micro-electro-mechanical system varactors 100 have been simulated having up to 10 pF capacitances and tuning ranges greater than 10. Representative embodiments disclosed herein can be co-fabricated with micro-electro-mechanical system radio frequency switches and other devices.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A micro-electro-mechanical system varactor, comprising:
    a substrate;
    a lower bias conductor partially overlaying the substrate;
    a first signal conductor partially overlaying the substrate;
    a dielectric layer at least partially overlaying the first signal conductor;
    a support structure coupled to the substrate; and
    a flexible structure coupled to the support structure, suspended over the substrate, comprising an upper bias conductor overlaying at least part of the lower bias conductor and a top conductor overlaying at least part of the first signal conductor, configured to deflect in response to a bias voltage applied between the upper bias conductor and the lower bias conductor, configured for separation between the top conductor and the dielectric layer by an initial separation distance if the bias voltage is zero, configured for physical contact between the top conductor and the dielectric layer if the magnitude of the bias voltage is greater than a specified value, and configured for separation between the top conductor and the dielectric layer by greater than zero and less than the initial separation distance if the bias voltage has magnitude greater than zero and less than the specified value.

2. The micro-electro-mechanical system varactor as recited in claim 1, wherein the micro-electro-mechanical system varactor is physically configured such that an equivalent circuit of the micro-electro-mechanical system varactor comprises a first capacitor, wherein the first capacitor represents distributed capacitance between the first signal conductor and a second signal conductor, and wherein the second signal conductor is coupled to a ground plane.

3. The micro-electro-mechanical system varactor as recited in claim 2, wherein the micro-electro-mechanical system varactor is physically configured such that the equivalent circuit of the micro-electro-mechanical system varactor further comprises a second capacitor, a third capacitor, a fourth capacitor, and a fifth capacitor, wherein the series combination of the second capacitor and the third capacitor represents distributed capacitance between the movable top conductor and the first signal conductor, wherein the series combination of the fourth capacitor and the fifth capacitor represents distributed capacitance between the movable top conductor and the second signal conductor, wherein the second capacitor represents that part of the distributed capacitance between the movable top conductor and the first signal conductor when the top conductor is in physical contact with the dielectric layer, and wherein the fourth capacitor represents that part of the distributed capacitance between the movable top conductor and the second signal conductor when the top conductor is in physical contact with the dielectric layer.

4. The micro-electro-mechanical system varactor as recited in claim 1, further comprising:
    an antenna device coupled to the first signal conductor, wherein the antenna device comprises an antenna.

5. The micro-electro-mechanical system varactor as recited in claim 4, wherein the antenna device further comprises antenna components interposed between the antenna and the first signal conductor.

6. The micro-electro-mechanical system varactor as recited in claim 1, further comprising:
a second signal conductor partially overlaying the substrate, wherein the dielectric layer at least partially overlays the second signal conductor and wherein the top conductor at least partially overlays the second signal conductor.

7. The micro-electro-mechanical system varactor as recited in claim 6, wherein the micro-electro-mechanical system varactor is physically configured such that an equivalent circuit of the micro-electro-mechanical system varactor comprises a first capacitor which represents distributed capacitance between the first signal conductor and the second signal conductor.

8. The micro-electro-mechanical system varactor as recited in claim 7, wherein the micro-electro-mechanical system varactor is physically configured such that the equivalent circuit of the micro-electro-mechanical system varactor further comprises a second capacitor, a third capacitor, a fourth capacitor, and a fifth capacitor, wherein the series combination of the second capacitor and the third capacitor represents distributed capacitance between the movable top conductor and the first signal conductor, wherein the series combination of the fourth capacitor and the fifth capacitor represents distributed capacitance between the movable top conductor and the second signal conductor, wherein the second capacitor represents that part of the distributed capacitance between the movable top conductor and the first signal conductor when the top conductor is in physical contact with the dielectric layer, and wherein the fourth capacitor represents that part of the distributed capacitance between the movable top conductor and the second signal conductor when the top conductor is in physical contact with the dielectric layer.

9. The micro-electro-mechanical system varactor as recited in claim 6, further comprising:
an antenna device coupled to the second signal conductor, wherein the antenna device comprises an antenna and wherein the micro-electro-mechanical system varactor is configured to enable coupling of the first signal conductor to other circuitry.

10. The micro-electro-mechanical system varactor as recited in claim 9, wherein the antenna device further comprises antenna components interposed between the antenna and the second signal conductor.

11. The varactor as recited in claim 6, further comprising:
a via conductor, wherein the substrate has a top surface and a bottom surface, wherein a hole is located in the substrate under the second signal conductor, wherein the hole extends from the top surface to the bottom surface, and wherein the via conductor is coupled to the second signal conductor and to a ground plane.

12. The micro-electro-mechanical system varactor as recited in claim 11, wherein the micro-electro-mechanical system varactor is physically configured such that an equivalent circuit of the micro-electro-mechanical system varactor comprises a first capacitor which represents distributed capacitance between the first signal conductor and the second signal conductor.

13. The micro-electro-mechanical system varactor as recited in claim 12, wherein the micro-electro-mechanical system varactor is physically configured such that the equivalent circuit of the micro-electro-mechanical system varactor further comprises a second capacitor, a third capacitor, a fourth capacitor, and a fifth capacitor, wherein the series combination of the second capacitor and the third capacitor represents distributed capacitance between the movable top conductor and the first signal conductor, wherein the series combination of the fourth capacitor and the fifth capacitor represents distributed capacitance between the movable top conductor and the second signal conductor, wherein the second capacitor represents that part of the distributed capacitance between the movable top conductor and the first signal conductor when the top conductor is in physical contact with the dielectric layer, and wherein the fourth capacitor represents that part of the distributed capacitance between the movable top conductor and the second signal conductor when the top conductor is in physical contact with the dielectric layer.

14. The micro-electro-mechanical system varactor as recited in claim 11, further comprising:
an antenna device coupled to the first signal conductor, wherein the antenna device comprises an antenna and wherein the micro-electro-mechanical system varactor is configured to enable coupling of the first signal conductor to other circuitry.

15. The micro-electro-mechanical system varactor as recited in claim 6, wherein the first signal conductor and the second signal conductor are interdigitated.

16. The micro-electro-mechanical system varactor as recited in claim 1, wherein the material of the substrate is selected from the group consisting of organic materials, a fiberglass material, a polyimide material, and a ceramic material.

17. The micro-electro-mechanical system varactor as recited in claim 1, wherein the micro-electro-mechanical system varactor is fabricated in the form of a transmission line element.

18. The micro-electro-mechanical system varactor as recited in claim 17, wherein the form of the transmission line element is selected from the group consisting of a microstrip, a stripline, a coplanar transmission line, a suspended waveguide, suspended stripline, finline, and a Thinline.

19. A method for fabricating a micro-electro-mechanical system varactor, comprising:
overlaying a top surface of a substrate with a first signal conductor and a second signal conductor, wherein the first signal conductor partially covers the substrate and wherein the second signal conductor partially covers the substrate;
overlaying the first signal conductor and the second signal conductor with a dielectric layer, wherein the dielectric layer at least partially covers the first and the second signal conductors;
creating a support structure coupled to the substrate; and
attaching a flexible structure overlaying the substrate to the support structure, wherein the flexible structure comprises an upper bias conductor and a top conductor, wherein the upper bias conductor at least partially covers a lower bias conductor, wherein the top conductor at least partially covers the first signal conductor and the second signal conductor, wherein the flexible structure is configured to deflect in response to a bias voltage applied between the upper bias conductor and the lower bias conductor, wherein the flexible structure is configured for separation between the top conductor and the dielectric layer by an initial separation distance if the bias voltage is zero, wherein the flexible structure is configured for physical contact between the top conductor and the dielectric layer if the magnitude of the bias voltage is greater than a specified value, and wherein the flexible structure is configured for separation between the top conductor and the dielectric layer by greater than zero and less than the initial separation distance if the bias voltage has magnitude greater than zero and less than the specified value.

20. A micro-electro-mechanical system varactor, comprising:
  a first means for capacitively coupling an input signal from a first signal line to a second signal line, wherein the first means has a fixed value of capacitance; and
  a variable capacitance means for capacitively coupling the input signal from the first signal line to the second signal line, wherein the variable capacitance means comprises a series coupling of a second means, a third means, a fourth means, and a fifth means for capacitively coupling the signal from the first signal line to the second signal line, wherein the second means couples the signal from the input first signal line to the third means, wherein the third means couples the signal from the second means to the fifth means, wherein the fifth means couples the signal from the third means to the fourth means, wherein the fourth means couples the signal from the fifth means to the output second signal line, wherein the second means and the fourth means have fixed values of capacitance, wherein the capacitances of the third and the fifth means are variable and responsive to a bias voltage, wherein the capacitances of the third and the fifth means each have their respective minimum value of capacitance at zero bias voltage, and wherein the capacitances of the third and the fifth means each have their respective maximum value of capacitance at and above a magnitude of bias voltage greater than a specified value.

* * * * *